United States Patent Office 2,807,910
Patented Oct. 1, 1957

2,807,910

SOIL CONDITIONING WITH POLYQUATERNARY AMMONIUM COMPOUNDS

John G. Erickson, Minneapolis, Minn., assignor to General Mills, Inc., a corporation of Delaware No Drawing. Application October 9, 1952,
Serial No. 313,987

16 Claims. (Cl. 47—58)

The present invention relates to a process for improving clay soils. The process consists of adding small amounts of polyquaternary ammonium compounds to such soils.

It is, therefore, an object of the present invention to provide a process of improving the properties of clay soils by means of polyquaternary ammonium compounds.

Several soil conditioners have been reported recently. Most of them are composed essentially of sodium polyacrylate. Another type is the salt of a copolymer of maleic acid and vinyl acetate. All of them, however, are polyanionic.

In contrast to these prior soil conditioners, the present soil conditioners are polycationic. They comprise the polyquaternary ammonium compounds.

The effects produced by the polyquaternary ammonium compounds vary with the nature of the polyquaternary ammonium compounds. An important use for these polyquaternary ammonium compounds is for conditioning clay soil for agricultural purposes. The quaternary ammonium groups react with the soil particles and tend to bind individual particles into aggregates of larger size which no longer possess the colloidal properties of clay when wet. By employing a polyquaternary ammonium compound which has an appreciable solubility in water (5% or more based on the weight of the solution), it is found that the principal effect on clay soils is an improvement in the porosity and friability of the soils. At the same time, the soil is put into a condition in which it may be readily wetted. The polyquaternary ammonium compounds are also useful for the stabilization of colloidal soils against erosion. A specific use of this type is the stabilization of a colloidal beach soil to prevent erosion and to modify its characteristics to simulate a sand beach.

The invention also contemplates the use of polyquaternary ammonium compounds which are less soluble than those referred to above, but which still are capable of reacting with the soil to affect its properties. Generally, these polyquaternary ammonium compounds of lesser solubility are useful for other than agricultural purposes. They tend to waterproof the soil so that the soil is not easily wetted, and these polyquaternary ammonium compounds may be used in soil stabilization, for road building, athletic fields, race tracks and the like.

Any of a wide variety of polyquaternary ammonium compounds may be used for the present invention. The term "polyquaternary ammonium compound" is intended to include compounds containing two or more quaternary ammonium groups. The various polyquaternary ammonium compounds react at different rates depending upon their composition. Generally, the highly soluble (5% or more) polyquaternary ammonium compounds react very readily and immediately change the characteristics of the soil. Those which are less soluble than 5% react more slowly with the soil, but in view of their limited solubility are not readily leached from the soil. Accordingly, they remain in the soil and gradually dissolve and react with the soil particles as the molecules of the polyquaternary ammonium compound in solution are removed from solution by reaction with the soil. Accordingly, it is possible to employ polyquaternary ammonium compounds with very low degrees of solubility, even lower than $\frac{1}{10}$ of 1%.

The polyquaternary ammonium compounds may be used in very small amounts; usually from 0.05–0.5% based on the weight of the soil is a suitable working range. However, even smaller quantities produce some desirable results, and it is apparent that even larger amounts may be used. Usually, however, it is not necessary to use a quantity in excess of 1%.

The nitrogen atoms of the polyquaternary ammonium compounds can be separated by hydrocarbon groups, such as methylene, ethylene, propylene and the like, or by groups containing hetero atoms, such as oxygen, nitrogen and sulphur. The groups intervening between the nitrogen atoms can be straight or branched chain and can contain aromatic or heterocyclic nuclei. In polyquaternary ammonium compounds containing more than two quaternary ammonium groups, the groups intervening between the various nitrogen atoms can be alike or different.

A wide variety of substituents can be present on the nitrogen atoms. These include simple alkyl groups, such as methyl, ethyl, propyl, dodecyl, octadecyl, substituted alkyl groups such as hydroxy ethyl, and the like; aryl groups such as phenyl, tolyl and the like; and heterocyclic groups such as pyrodyl and the like. Similarly, the nitrogen in the quaternary ammonium group can be part of a heterocyclic ring, as in the case of a pyridinium group, a morpholinium group and the like. Typical anions which may be associated with the quaternary ammonium groups include the halides (chloride, bromide and iodide), nitrate, sulphate, phosphate, acetate, formate, chloroacetate, oxalate and benzoate. The anions on the polyquaternary ammonium compound may be alike or different.

While any polyquaternary ammonium compound may be used for the purposes of the present invention, and while they may be made in any of the conventional methods, a great variety of polyquaternary ammonium compounds is available by the simple reaction of amines with polyhalogen compounds. The preferred polyquaternary ammonium compounds are those which are essentially linear or which are of the simple branched chain variety, as distinguished from the cross-linked variety. It is also possible to employ polyquaternary ammonium compounds which are composed of linear polymers cross-linked to a greater or lesser extent. The polymers which are highly cross-linked have a very low degree of solubility, and accordingly react slowly with the soil. Those which have a small degree of cross-linking are more soluble and react more readily with the soil. The preferred polyquaternary ammonium compounds are the simpler straight chain compounds. The polyquaternary ammonium compounds prepared from tertiary monoamines and polyhalogen compounds are preferred because of the ready availability of the starting materials and the simplicity of their reaction. It should be pointed out that when secondary amines are employed for the preparation of the quaternary ammonium compounds, the polyhalogen compound should have either less than 4 or more than 5 atoms separating adjacent halogen atoms in order to avoid the formation of cyclic compounds containing only one quaternary ammonium group.

The preferred amines for the preparation of the quaternary ammonium compounds for agricultural purposes are the lower alkyl secondary and tertiary monoamines in which the alkyl groups contain from 1–4 carbon atoms. Other preferred amines are the secondary and tertiary polyamines in which the amine groups are separated by hydrocarbon groups, either straight or branched chain, containing from 2–6 carbon atoms; or by polyoxyalkylene groups containing from 2–6 recurring units and each alkylene group containing from 2–6 carbon atoms. The nitrogen atoms may be further substituted by lower alkyl substituents, containing 1–4 carbon atoms. Typical amines which are useful in preparing the polyquaternary ammonium compounds include the following alkylamines, aromatic amines and cyclic amines: dimethylaniline, trimethylamine, diethylamine, dibutylamine, triethanolamine, iminodipropionitrile, tripropylamine, dioctadecylamine, didodecylamine, N-methyl-p-toluidine, N,N-dimethylbenzylamine, 2-dimethylaminothiophene, piperidine,, pyridine, γ-picoline, pyrrolidine, morpholine, quinoline, N-hydroxyethylmorpholine, N,N,N',N'-tetramethylenediamine, 1,2-bis(2-dimethylaminoethoxy)-ethane, 1,3-dipiperid-1-ylpropane and N-[2-(2-dibutylaminoethoxy)-ethyl]-morpholine.

For the preparation of polyquaternary ammonium compounds for waterproofing soil, any of the above amines may be used, but should contain one or more aliphatic hydrocarbon groups having from 8–22 carbon atoms.

The polyhalogen compounds are preferably those in which the halogen atoms are separated by hydrocarbon groups, either straight or branched chain, containing from 2–6 carbon atoms; or by polyoxyalkylene groups containing from 2–6 recurring units, each alkylene group containing from 2–6 carbon atoms. Typical polyhalogen compounds include ethylene dichloride, ethylene dibromide, propylene dichloride, propylene dibromide, 2-chloroethyl ether, tri- and tetraglycol dichlorides, 2-chloroethyl sulfide, 1,5-diiodopentane, 1,4-dichlorobutane, p-bis(chloromethyl)benzene.

These amines and polyhalogen compounds may be reacted in accordance with known methods to produce the polyquaternary ammonium compounds. Where tertiary polyamines are used, the product is a polyquaternary ammonium compound which may possess terminal halogen or amine groups. The terminal amine groups may or may not be further alkylated, in any conventional manner, depending on the number of quaternary ammonium groups desired in the compound. Where secondary amines are employed, it will be apparent that the amino groups must be alkylated twice to produce the quaternary ammonium compounds. The second alkylation may be by means of a mono or polyhalogen compound. The product obtained by the use of a polyhalogen compound may possess terminal halogen atoms or secondary or tertiary amine groups. Similarly, these terminal amine groups may or may not be alkylated further, depending on the number of quaternary ammonium groups desired in the product. In general, from 2–5 quaternary ammonium groups in the compound are sufficient for the purposes of the present invention, and no great advantage is obtained with compounds having a larger number of such groups.

Typical polyquaternary ammonium compounds which can be used in the present invention are given in the following list. Included are complete polyquaternary ammonium compounds as well as groups which of themselves contain a plurality of polyquaternary groups or which contain only a single quaternary ammonium group. Where the group is indicated as containing a plurality of quaternary ammonium groups, the compound can be monomeric, in which case the remaining valences can be satisfied by hydrogen or some other group; or the compound can be polymeric, containing a number of the indicated recurring groups. Where the recurring group contains only a single quaternary ammonium group, the compound obviously must be composed of at least two such recurring groups.

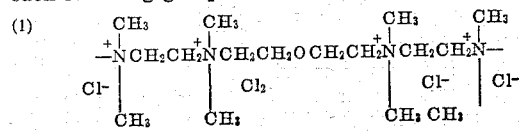

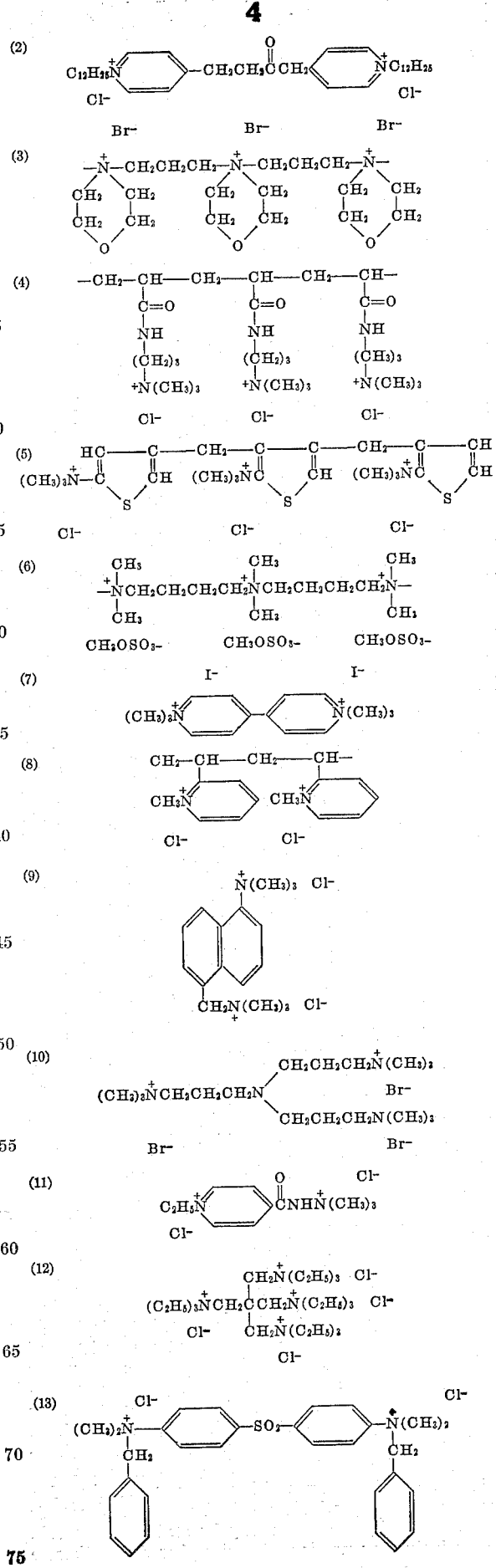

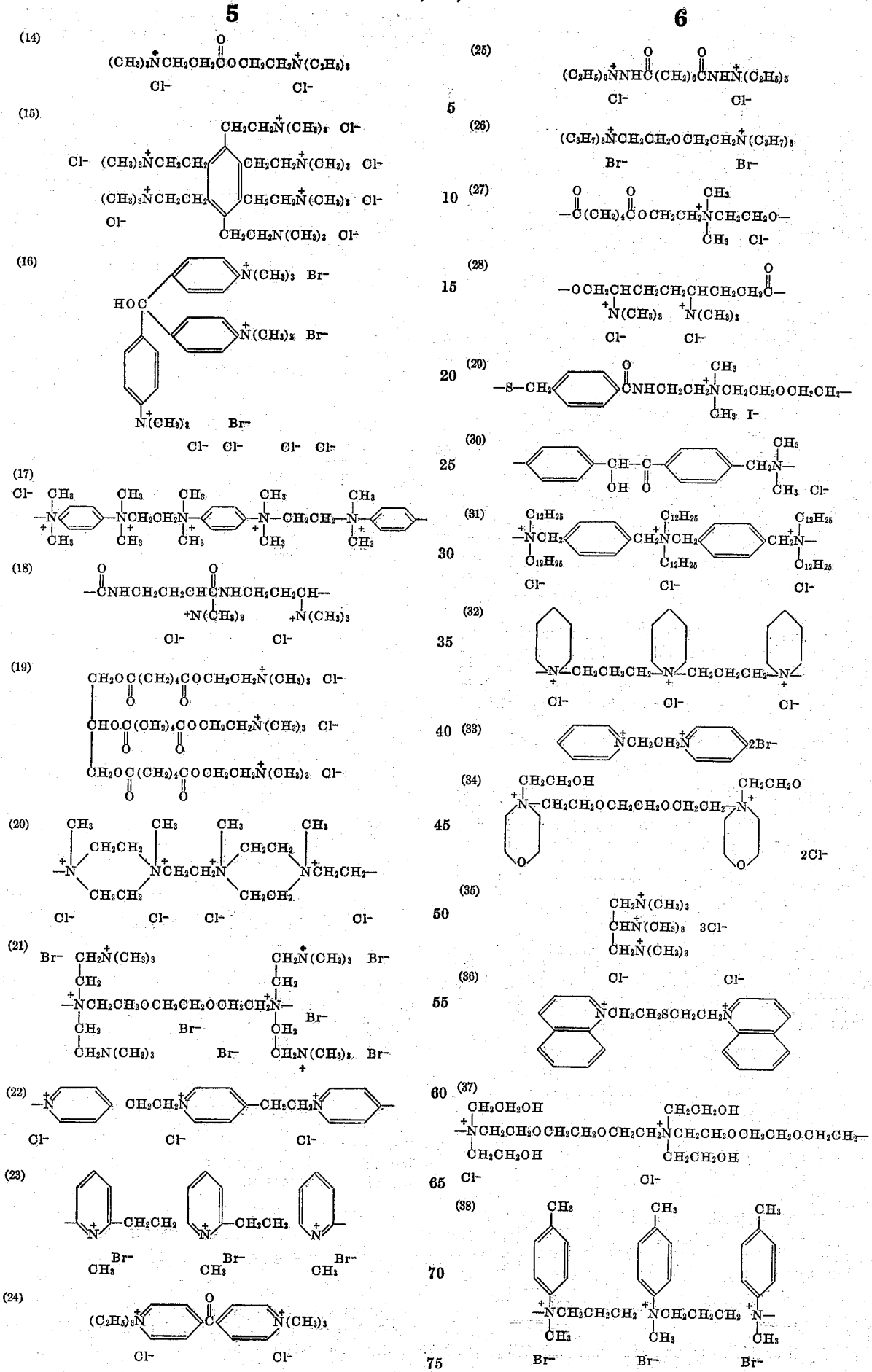

(39)

$$\underset{Cl^-}{\underset{|}{\overset{+}{N}}CH_2CH_2CH_2CH_2\overset{+}{\underset{|}{N}}} \underset{Cl^-}{\overset{CH_3}{\underset{CH_3}{|}}}$$

The treatment of the soil with these conditioners may be effected in either of two ways. The polyquaternary ammonium compound may be stirred as a dry powder into the dry soil. Addition of water then brings about the reaction which confers porosity onto the soil. The other method involves the addition of the polyquaternary ammonium compound to the soil in the form of a water solution.

Example 1

Triglycol dichloride was heated with an excess amount of triethylamine until reaction was complete. Removal of the excess amine by distillation under reduced pressure left a diquaternary ammonium compound of the following structure:

$$(C_2H_5)_3\overset{+}{N}CH_2CH_2OCH_2CH_2OCH_2CH_2\overset{+}{N}(C_2H_5)_3$$
$$Cl^- \qquad\qquad Cl^-$$

0.5 part of this diquaternary compound was mixed with 100 parts of pulverized, dry clay soil. 50 parts of water was then added. The mixture, after drying, possessed a porous structure which rapidly absorbed water. It was a friable mass, easily crumbled between the fingers.

A sample of the same clay soil, without the added diquaternary compound, was also wet with water. It dried to a hard, bricklike mass, which metal tools could crush only with difficulty. Water poured on this mass was not immediately absorbed.

Two other samples of this soil were treated with a salt of a copolymer of maleic acid and vinyl acetate (a polyanionic soil conditioner now on the market). In one sample, 0.1% by weight of the conditioner was used; in the other, 0.5%. Both were wet with water and allowed to dry. While in each case, the treated soil absorbed water rapidly, the soil after drying was very hard.

Example 2

0.1 part of the diquaternary ammonium compound resulting from the reaction of triethylamine and triglycol dichloride was mixed with 100 parts of dry, pulverized clay soil and 50 parts of water was added. When the mixture had dried, it possessed excellent properties of porosity and workability; it absorbed water quickly and was friable.

Example 3

Triglycol dichloride was heated with excess tributylamine until the reaction was complete. Excess amine was removed under reduced pressure. This left a diquaternary ammonium compound of the following structure:

$$(C_4H_9)_3\overset{+}{N}CH_2CH_2OCH_2CH_2OCH_2CH_2\overset{+}{N}(C_4H_9)_3$$
$$Cl^- \qquad\qquad Cl^-$$

50 parts of a 0.8% aqueous solution of this diquaternary compound was added to 100 parts of pulverized dry clay soil. After drying, this soil was friable and absorbed water very rapidly.

Example 4

Triglycol dichloride was heated with an excess amount of pyridine until reaction had ceased. The excess pyridine was distilled off, leaving a dipyridinium compound of the structure:

$$\overset{+}{N}CH_2CH_2OCH_2CH_2OCH_2CH_2\overset{+}{N}$$
$$Cl^- \qquad\qquad Cl^-$$

0.5 part of this compound was mixed with 100 parts of powdered, dry clay soil. 50 parts of water was added. When dry, the soil was desirably friable and porous.

Example 5

A mixture of 80.3 parts of diethylamine, 74.8 parts of triglycol dichloride, and 160 parts of butyl alcohol was refluxed for 19 hours. The mixture was then filtered and stripped of solvent under reduced pressure. The residue was mixed with benzene, washed with concentrated sodium hydroxide solution and water, and then distilled to give 1,2-bis(2-diethylaminoethoxy)ethane, a colorless liquid boiling at 85–100° C. at 0.05–0.10 mm. of mercury.

A mixture of 26 parts of this diamine, 9.3 parts of triglycol dichloride, and 40 parts of butyl alcohol was refluxed for several hours, then stripped of solvent to yield a mixture of polymeric quaternary ammonium compounds containing from 2–5 or more quaternary ammonium groups. 50 parts of a 1% solution of this mixture of compounds was poured onto 100 parts of pulverized dry clay soil. After drying, this soil was friable and absorbed water very rapidly.

Example 6

Allyltriethylammonium chloride was prepared by allowing a benzene solution of allyl chloride and triethylamine to stand for several days. The product was filtered off, dissolved in water and heated overnight at 130° C. with a small quantity of di-tert-butylperoxide. This gave an aqueous solution of the polymer of allyltriethylammonium chloride. Its structure contained the following recurring groups:

$$\begin{array}{c} CH_2CH- \\ | \\ CH_2 \\ | \\ +N\ Et_3 \\ | \\ Cl^- \end{array}$$

The product was a mixture of compounds containing 3–5 of these recurring units.

50 parts of a 1% aqueous solution of this material was poured onto 100 parts of pulverized, dry clay soil. After drying, the soil was very easily crumbled by the fingers and absorbed water as fast as it was poured on.

Example 7

The following diquaternary ammonium compound was prepared by heating pyridine with ethylene bromide.

$$\overset{+}{N}CH_2CH_2\overset{+}{N}$$
$$2Br^-$$

Fifty parts of a 1% aqueous solution of this compound was poured onto 100 parts of crushed dry clay soil. When dry, the soil was a very easily crumbled mass.

A similar clay soil sample, wet with water and allowed to dry, set to a bricklike mass.

Example 8

Excess didodecylamine was heated with trimethylene dibromide to form 1,3-bis(didodecylamino)propane. This diamine was heated with more trimethylene dibromide to give a polymeric quaternary compound of the following structure:

$$\begin{array}{cc} C_{12}H_{25} & C_{12}H_{25} \\ | & | \\ -\overset{+}{N}CH_2CH_2CH_2\overset{+}{N}CH_2CH_2CH_2- \\ | & | \\ Br^-\ C_{12}H_{25} & C_{12}H_{25} \\ & Br^- \end{array}$$

One-half part of this product was mixed with 100 parts of finely ground dry clay soil and water was added. The water did not wet the soil.

Example 9

N-octadecyl morpholine was heated with chloroethyl ether to give a diquaternary compound of the following structure:

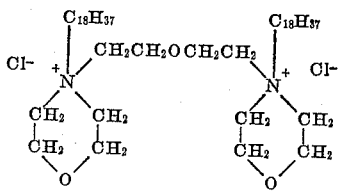

One-half part of this compound was mixed with 100 parts of finely ground dry clay soil. When water was added it did not wet the soil.

I claim as my invention:

1. Process of conditioning clay soil which comprises adding thereto a polyquaternary ammonium compound in which each quaternary nitrogen atom is a member of a ring and in which the nitrogen atoms are separated by hydrocarbon groups containing from 2–6 carbon atoms in the amount of from 0.05–0.50% based on the weight of the soil.

2. Process of conditioning clay soil which comprises adding thereto a polyquaternary ammonium compound in which each quaternary nitrogen atom is a member of a ring and in which the nitrogen atoms are separated by a polyoxyalkylene group containing from 2–6 recurring units, each alkylene group containing from 2–6 carbon atoms in the amount of from 0.05–0.50% based on the weight of the soil.

3. Process of conditioning clay soil which comprises adding thereto a polyquaternary ammonium compound in the amount of from 0.05–0.50% based on the weight of the soil having the following formula:

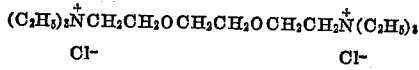

4. Process of conditioning clay soil which comprises adding thereto a polyquaternary ammonium compound in the amount of from 0.05–0.50% based on the weight of the soil having the following formula:

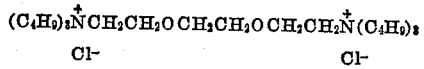

5. Process of conditioning clay soil which comprises adding thereto a polyquaternary ammonium compound in the amount of from 0.05–0.50% based on the weight of the soil having the following formula:

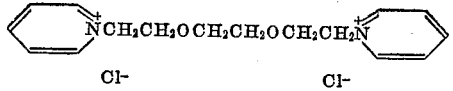

6. Process of conditioning clay soil which comprises adding thereto a polyquaternary ammonium compound in the amount of from 0.05–0.50% based on the weight of the soil resulting from the reaction of diethylamine and triglycol dichloride.

7. Process of conditioning clay soil which comprises adding thereto a polyquaternary ammonium compound in the amount of from 0.05–0.50% based on the weight of the soil comprising polymerized allyl trialkyl ammonium chloride.

8. Process of conditioning clay soil which comprises adding thereto a polyquaternary ammonium compound in the amount of from 0.05–0.50% based on the weight of the soil comprising polymerized allyl triethyl ammonium chloride.

9. Clay soil conditioned with a polyquaternary ammonium compound in which each quaternary nitrogen atom is a member of a ring and in which the quaternary nitrogen atoms are separated by hydrocarbon groups containing from 2 to 6 carbon atoms said compound being present in the amount of 0.05–0.50% based on the weight of said soil.

10. Clay soil conditioned with a polyquaternary ammonium compound in which each quaternary nitrogen atom is a member of a ring and in which the quaternary nitrogen atoms are separated by a polyoxyalkylene group containing from 2 to 6 recurring units, each alkylene group containing from 2 to 6 carbon atoms said compound being present in the amount of 0.05–0.50% based on the weight of said soil.

11. Process of conditioning clay soil which comprises adding thereto a polyquaternary ammonium compound containing 2 to 5 quaternary groups in which the quaternary nitrogen atoms are linked through a member selected from the group consisting of alkylene radicals containing 2 to 6 carbon atoms and polyoxyalkylene radicals in the amount of from 0.05–0.50% based on the weight of the soil.

12. Process of conditioning clay soil which comprises adding thereto a polyquaternary ammonium compound containing 2 to 5 quaternary groups in which the quaternary nitrogen atoms are linked through an alkylene radical containing 2 to 6 carbon atoms in the amount of from 0.05–0.50% based on the weight of the soil.

13. Process of conditioning clay soil which comprises adding thereto a polyquaternary ammonium compound containing 2 to 5 quaternary groups in which the quaternary nitrogen atoms are linked through a polyoxyalkylene radical containing from 2–6 recurring units, each alkylene group containing from 2 to 6 carbon atoms in the amount of 0.05–0.50% based on the weight of the soil.

14. Clay soil conditioned with a polyquaternary ammonium compound containing 2 to 5 quaternary groups in which the quaternary nitrogen atoms are linked through a member selected from the group consisting of alkylene radicals containing 2 to 6 carbon atoms and polyoxyalkylene radicals in the amount of from 0.05–0.50% based on the weight of the soil.

15. Clay soil conditioned with a polyquaternary ammonium compound containing 2 to 5 quaternary groups in which the quaternary nitrogen atoms are linked through an alkylene radical containing 2 to 6 carbon atoms in the amount of from 0.05–0.50% based on the weight of the soil.

16. Clay soil conditioned with a polyquaternary ammonium compound containing 2 to 5 quaternary groups in which the quaternary nitrogen atoms are linked through a polyoxyalkylene radical containing from 2–6 recurring units, each alkylene group containing from 2 to 6 carbon atoms in the amount of 0.05 to 0.50% based on the weight of the soil.

References Cited in the file of this patent

UNITED STATES PATENTS

| | | |
|---|---|---|
| 2,113,606 | Taub et al. | Apr. 12, 1938 |
| 2,271,378 | Searle | Jan. 27, 1942 |
| 2,370,031 | Graenacher | Feb. 20, 1945 |
| 2,378,235 | Miles | June 12, 1945 |
| 2,519,999 | De Benneville | Aug. 22, 1950 |
| 2,614,917 | Zukel | Oct. 21, 1952 |
| 2,625,471 | Mowry et al. | Jan. 13, 1953 |

OTHER REFERENCES

Bovet et al.: Arch Intern. Pharmacodynamie, vol. 80, pages 137–149 (1949).